United States Patent
Bhattacharyya et al.

(10) Patent No.: US 6,306,301 B1
(45) Date of Patent: Oct. 23, 2001

(54) SILICA-BASED MEMBRANE SORBENT FOR HEAVY METAL SEQUESTRATION

(75) Inventors: Dibakar Bhattacharyya; Stephen M. Ritchie; Leonidas G. Bachas; Jamie A. Hestekin, all of Lexington, KY (US); Subhas K. Sikdar, Blue Ash, OH (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 09/454,185

(22) Filed: Dec. 3, 1999

Related U.S. Application Data

(63) Continuation-in-part of application No. 09/084,631, filed on May 26, 1998, now Pat. No. 6,139,742, which is a continuation-in-part of application No. 08/740,574, filed on Oct. 31, 1996, now abandoned.

(51) Int. Cl.[7] .................................................. B01D 61/08
(52) U.S. Cl. .............................. 210/500.26; 210/500.36; 210/500.37
(58) Field of Search .............................. 210/490, 500.23, 210/500.29, 500.3, 500.31, 500.32, 500.37, 500.38, 500.39, 500.26, 500.36

(56) References Cited

U.S. PATENT DOCUMENTS

| | | | |
|---|---|---|---|
| 3,948,863 | 4/1976 | Akamatsu et al. | 210/38 |
| 3,951,920 | * 4/1976 | Senoo | 210/500.29 |

(List continued on next page.)

OTHER PUBLICATIONS

S.M.C. Ritchie et al., "Surface Modification of Silica–and Cellulose Based Microfiltration Membranes with Functional Polyamino Acids for Heavy Metal Sorption," U.S. Army Engr. CEWES (Vicksburg, Mississippi), pp. 6346–6357, Oct. 1999.

Grigory I. Tysin et al., "Cellulose Fibrous Sorbents with Conformationally Flexible Aminocarboxylic Groups for Preconcentration of metals," Mikrochimica Acta, 3rd ed., Springer–Verlag (Austria), p. 53–60, (Mar. 17, 1991).

S. Krishnamurthy & Raymond M. Frederick, "Using Biopolymers to Remove Heavy Metals from Soil and Water," Remediation/Spring, UMI Article Clearinghouse (USA), p. 235–244, (Aug. 13, 1994).

John R. Deans & Brian G. Dixon, "Uptake of Pb2+ and CU2+ by Novel Biopolymers," Cape Cod Research, Inc., Pergamon Press (Great Britain) (Buzzards Bay, MA), vol. 26 (No. 4), p. 469–472, (Aug. 13, 1992).

Stanley R. Sandler & Wolf Karo, "Organic Functional Group Preparations," Academic Press (New York & London), p. 246–267, (Aug. 13, 1971).

(List continued on next page.)

*Primary Examiner*—Ernest G. Therkorn
(74) *Attorney, Agent, or Firm*—King & Schickli, PLLC

(57) ABSTRACT

An apparatus providing for metal ion/nitrate entrapment comprises a chemically activated, microfiltration, composite polymer and silica-based membrane including a polyamino acid attached thereto through reaction of a terminal amine group of the polyamino acid with the membrane. A method for preparing such a chemically activated or polyamino acid functionalized membrane includes the steps of permeating the silica-based membrane with a solution of silane and a solvent so as to react methoxy groups of the silane with silanol groups of the membrane to incorporate epoxide groups and attaching a polyamino acid to the membrane by reacting a terminal amine group of the polyamino acid with one of the epoxide groups on the membrane.

10 Claims, 3 Drawing Sheets

U.S. PATENT DOCUMENTS

| | | | |
|---|---|---|---|
| 4,092,250 | 5/1978 | Sano et al. | 210/501 |
| 4,125,462 | 11/1978 | Latty | 210/500.29 |
| 4,302,336 | 11/1981 | Kawaguchi et al. | 210/654 |
| 4,356,267 * | 10/1982 | Callegaro | 210/321.3 |
| 4,360,434 | 11/1982 | Kawaguchi et al. | 210/500.2 |
| 4,388,189 | 6/1983 | Kawaguchi et al. | 210/490 |
| 4,604,204 | 8/1986 | Linder et al. | 210/500.3 |
| 4,824,870 | 4/1989 | Pemawansa et al. | 521/53 |
| 4,873,033 | 10/1989 | Heckmann et al. | 261/41 |
| 4,915,839 | 4/1990 | Marinaccio et al. | 210/500.23 |
| 4,961,852 | 10/1990 | Pemawansa et al. | 210/490 |
| 4,983,291 | 1/1991 | Chau et al. | 210/500.37 |
| 5,015,387 * | 5/1991 | Nemori | 210/500.29 |
| 5,071,880 | 12/1991 | Sugo et al. | 521/27 |
| 5,087,372 | 2/1992 | Toyomoto et al. | 210/651 |
| 5,093,486 | 3/1992 | Diamantoglou | 210/651 |
| 5,098,569 * | 3/1992 | Stedronsky | 210/500.29 |
| 5,152,894 * | 10/1992 | Haubs | 210/500.38 |
| 5,286,449 | 2/1994 | Kuroda et al. | 210/500.23 |
| 5,403,750 | 4/1995 | Braatz et al. | 436/531 |
| 5,904,848 * | 5/1999 | Wong | 210/500.36 |
| 6,139,742 * | 10/2000 | Bhattacharyya | 210/500.3 |

OTHER PUBLICATIONS

Aldrich, "Technical Information Bulletin No. AL–142 Aldrich Ion–Exchange Resins and Related Polymeric Adsorbens," 1987 pp. 1–4.

Roy L. Whistler, "Method in Carbohydrate Chemistry," Academic Press (New York & London), (Mar. 17, 1963), pp. 164–168.

Roger W. Binkley, "Modern Carbohydrate Chemistry," Marcel Dekker, Inc., p. 232.

* cited by examiner

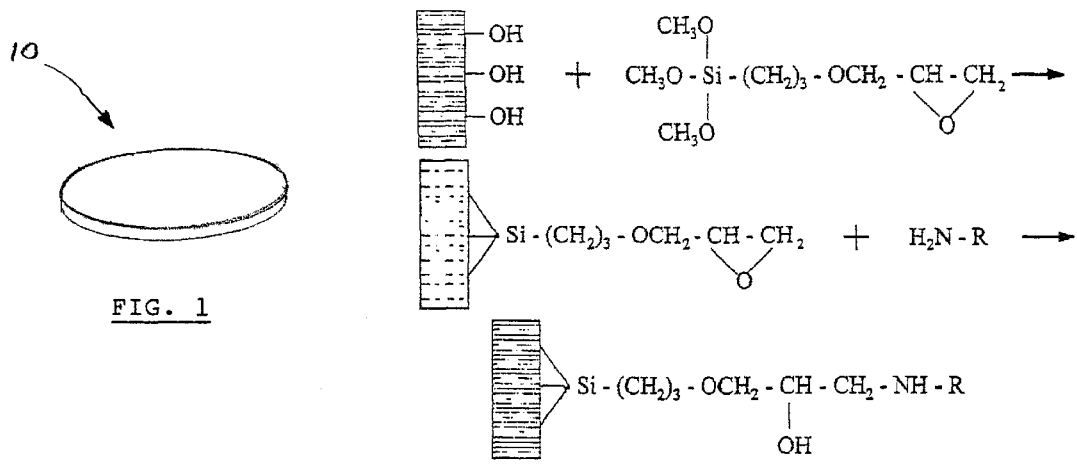
FIG. 1
FIG. 1a
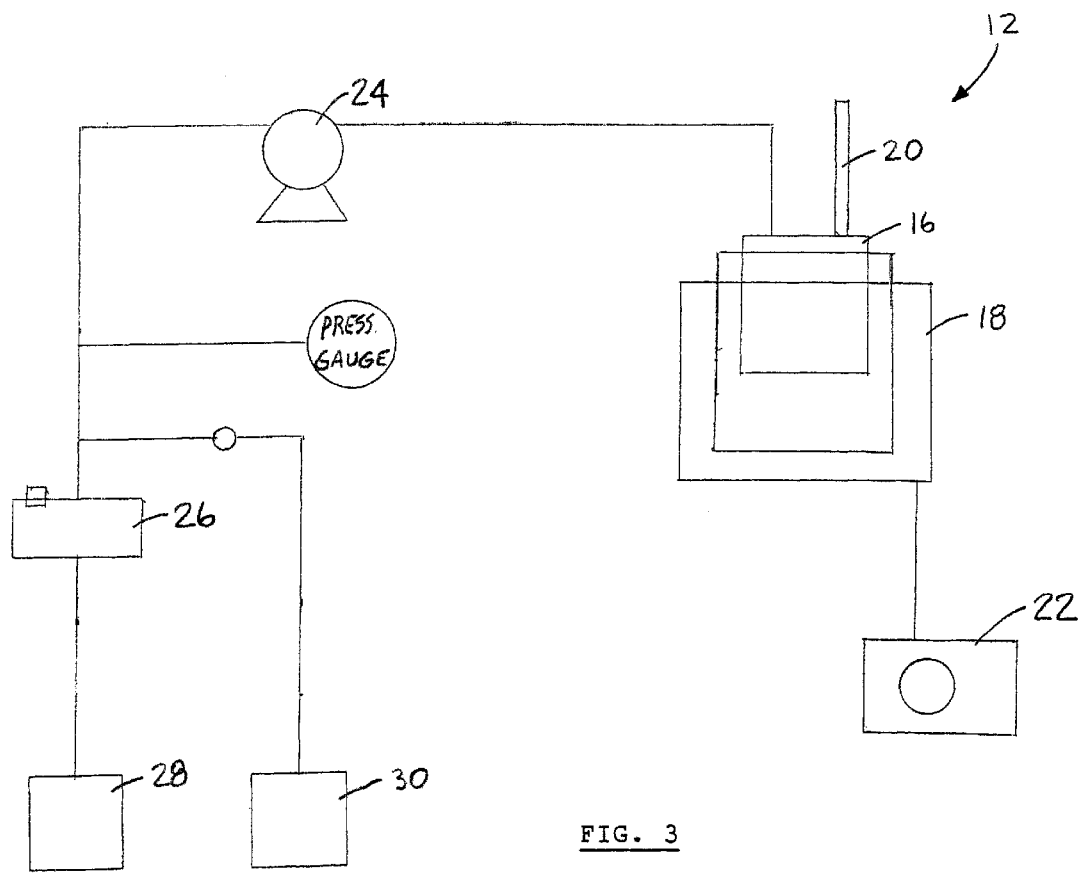
FIG. 3

US 6,306,301 B1

SILICA-BASED MEMBRANE SORBENT FOR HEAVY METAL SEQUESTRATION

This is a continuation-in-part of U.S. patent application Ser. No. 09/084,631, filed May 26, 1998, now U.S. Pat. No. 6,139,742, which is a continuation-in-part of U.S. patent application Ser. No. 08/740,574, filed Oct. 31, 1996, now abandon.

This invention was made with partial government support under NSF Grant No. 4-32118 and US EPA Grant No. 4-29695. The government may have certain rights in this invention.

TECHNICAL FIELD

The present invention relates generally to a chemically activated high capacity, microfiltration, composite polymer and silica-based membrane sorbent.

BACKGROUND OF THE INVENTION

Various sorbents/ion exchange materials are available for metal/nitrate ion sequestration. Unfortunately, however, all of these suffer from the disadvantage that they possess at most two or three functional groups capable of ion interaction per attachment site. Additionally, these conventional materials are in bead (porous) form and thus, are not suited for effective utilization in convective flow applications.

As a specific example of this, ion-exchange resins (IERs), such as strong acid or weak acid cationic exchangers, have been used extensively to recover heavy metals and/or to prepare high quality water. The typical theoretical capacity of these IERs is five meq/gram (see "Ion-Exchange Resins and Related Polymeric Adsorbents", Technical Bulletin AL-142, Aldrich Chemical Company). This capacity is quite low. For example, if one considers a typical charged metal ion such as nickel (II) a maximum uptake of only 0.15 gram of metal per gram of IER is possible. Further, the requirement for the regeneration of these IERs is a serious disadvantage as it produces concentrated waste solutions. Still further, the use of ion exchange beads requires column operations with high pressure drops and the rate of metal ion uptake is thereby limited by diffusion control.

Of course, there are many industrial situations where it is required to convert metal ions from the solution state to a solid form. This is done in order to facilitate the disposal of such metal species. In still other situations subsequent regeneration is not a consideration and/or a liquid volume reduction and entrapment of low levels of radioactive ions in a solid form is required. In these instances and applications, IERs have a significant cost disadvantage.

It is known, however, that liquid volume reduction and metal ion entrapment may be achieved using inexpensive, commercially available, high molecular weight cut-off ultra-filtration or microfiltration membranes in which internal surface areas range from 50–200 $m^2/gm$. The most inexpensive materials used to prepare such membranes are cellulose and its derivatives, cellulose acetate and cellulose triacetate. Examples of such membranes are disclosed, for example, in U.S. Pat. Nos. 4,824,870 and 4,961,852 both to Pemawansa et al.

Both flat sheet and wide bore hollow fiber (200–300 $\mu m$ in diameter) configurations are readily available commercially. However, direct use of these membranes for adsorption of a metal ion such as nickel (II) assuming the size of 6 Å for the hydrated metal ion species and an internal surface of 100 $m^2/gm$ of membrane, yields a maximum surface entrapment capacity of 0.034 grams of nickel per gram of membrane. This, of course, is too low for efficient liquid volume reduction. In fact, where only single complexation sites are available, one will require a relatively high surface area of membrane (approximately 3000 $m^2/gm$) in order to achieve a 1 gram of nickel uptake per gram of membrane.

In U.S. Pat. No. 4,604,204 to Linder et al., a cellulose acetate containing membrane having pore sizes of preferably 10–500 angstroms is treated with reagents such as di-aldehydes and diisocyanates that react with the hydroxyl groups of the membrane. The reagents function as linker molecules for the attachment of a polyfunctional oligomer or polymer. These membranes are made to exclude metal ions from pores rather than to entrap metals inside the pores.

While effective in excluding metal ions, this approach has several shortcomings. First, it should be appreciated that the linker molecules fill some space and tend to interfere with and close the relatively small diameter pores to subsequent reaction. Second, it should be appreciated that many times both functional groups of the linker molecules react with hydroxyl groups of the membrane leaving none available to subsequently react with the polyfunctional oligomer or polymer. Thus, the number of available sites for polyfunctional oligomer or polymer attachment is, in fact, quite limited thereby limiting the effectiveness of the modified membrane.

Still further, any cellulose based membrane suffers from an unacceptable degree of acid and/or solvent instability which limits or prevents its use in many applications. Thus, no form of chemical modification makes their use acceptable in these environs.

A need is therefore identified for an improved chemically activated microfiltration membrane that may be utilized for heavy metal ion sequestration and other purposes (e.g. nitrate ion sequestration) and that is characterized by a relatively high entrapment capacity heretofore unavailable in the art.

SUMMARY OF THE INVENTION

Accordingly, it is a primary object of the present invention to provide a chemically activated microfiltration membrane characterized by significantly enhanced surface entrapment capacity that is relatively easy to produce.

Another object of the present invention is to provide a chemically activated microfiltration membrane wherein polyamino acids are chemically attached to the membrane including within the pores in order to provide a relatively large number (e.g. 20–1000) of functional groups capable of ion entrapment per membrane attachment site.

Still another aspect of the present invention is to provide a unique and novel method for the preparation of high capacity chemically activated, microfiltration, composite polymer and silica-based membranes formed by means of the attachment of polyamino acids along the inside pore surfaces of the membranes.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an apparatus is provided for ion entrapment. The apparatus comprises a chemically activated microfiltration membrane constructed from a composite polymer and silica-based material. Such a silica-based membrane provides good stability in acids and solvents. Further, such a membrane is mechanically strong and resistant to both shrinking and swelling: problems which adversely effect organic resins such as sepharose and agarose.

The chemically activated microfiltration membrane includes a polyamino acid (e.g. polyglutamic acid, polyaspartic acid, polylysine, polyarginine, polycysteine and mixtures thereof) attached thereto. This attachment is by reaction of the terminal amine group of the polyamino acid with the membrane and, more specifically, an epoxide group on the membrane.

Specifically, the chemically activated, silica-based, microfiltration membrane is prepared by first removing any coating of oil on the membrane. This is followed by permeating the membrane with a solution of silane and a solvent so as to react methoxy groups of the silane with silanol groups of the membrane and thereby incorporate epoxide groups. Next is the removing of any residual silane. This is then followed by attaching a polyamino acid to the membrane by reacting a terminal amine group of the polyamino acid with an epoxide group on the membrane. This makes a strong, stable bond. Preferably, the membrane incorporates pores having a diameter of at least 1,000–6,000 angstroms so that the individual polyamino acid molecules may be attached to the membrane within the pores, even at pressures below 1 bar.

In accordance with still another aspect of the present invention, the method may include the step of regeneration of the membrane after metal entrapment by utilizing helix-coil properties of polyamino acids. This phenomena has been demonstrated with polyamino acids such as poly-L-aspartic acid and poly-L-glutamic acid.

The effects of helix formation allow one to close the interstitial spacing between ionized carboxylic acid groups of the polyaspartic acid and polyglutamic acid. Providing that the attached polyamino acids are not fully protonated, their electrostatic fields may be enhanced and thus, their overall effectiveness as a sorbent is likewise enhanced. Additionally, the helix formation also promotes radial chain expansion and the formation of a void near the center of the helix capable of sequestering cations because of the surrounding negative electrostatic field.

By utilizing this method it is possible to advantageously provide a membrane based sorbent wherein the available ion binding sites are multiplied and, therefore, the sequestration capacity of the membrane is significantly enhanced, perhaps between twenty and a hundred fold.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 1 is a perspective view of the chemically activated, microfiltration, composite polymer and silica-based membrane of the present invention;

FIG. 1a is a schematical illustration of the present method of preparing a chemically activated, silica-based microfiltration membrane;

FIG. 3 is a schematical illustration of the laboratory apparatus used for convective flow treatment of the silica-based membrane produced in accordance with the procedure illustrated in FIG. 2;

Figure 2:
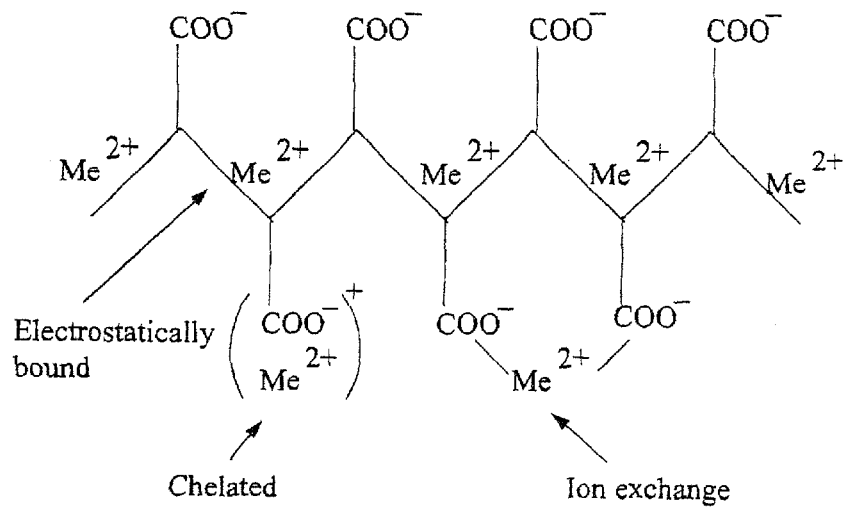
FIG. 2 is a schematic illustration of the metal sorption mechanisms for cation binding.

Reference will now be made in detail to the present preferred embodiment of the invention, an example of which is illustrated in the accompanying drawing.

DETAILED DESCRIPTION OF THE INVENTION

In accordance with the present invention, an apparatus is provided for ion entrapment of, for example, metals or nitrates. As shown in FIG. 1, the apparatus 10 comprises a chemically activated microfiltration membrane constructed from a composite polymer and silica-based material. Preferably, the composite polymer and silica-based membrane starting material is a state of the art industrial microfiltration membrane available from a number of sources. Such membranes are manufactured by the extrusion of a mixture of oil, submicron-sized silica particles and polyethylene resin. The membrane material is composed of about 70% of silica particles in polyethylene which is produced from a solvent extraction of oil from the matrix. Gaps between the adjacent silica aggregate particles constitute the membrane pores and the convective flow path. Such membranes typically have a pore size of approximately 0.1 $\mu$m, a thickness of 200 $\mu$m, an internal surface area of approximately 80m$^2$/gm and a dry mass of approximately 12.4 mg/cm$^2$.

Advantageously, the composite polymer and silica-based microfiltration membranes provide a pore size sufficiently large (0.1–0.6 $\mu$m) to accommodate large polyamino acids (6,000–36,000 MW). Further, the polymer chains have adequate access to active groups on the surface and may still dangle freely in the pore space. The open structure of the membranes also allows convective flow at low pressure. Further, attachment of the polyamino acids in a pore allows for dense packing of the attached polyamino acids. This enhances their combined electric charge field in a way not possible on a flat surface.

As best shown with reference to FIG. 1, the chemically activated microfiltration membrane is made by first removing any thin coating of oil remaining on the membrane following its production. Such oil is commonly found on the surface of a raw membrane. This removing may be completed by permeating the membrane with hexane and then following this up with an acetone rinse.

Next, is the step of permeating the membrane with a solution of silane in a solvent so as to react methoxy groups of the silane with silanol groups of the membrane and thereby incorporate epoxide groups. Specifically, a 5% solution (v/v) of silane (e.g. 3-glycidoxypropyltrimethoxysilane (GOPS)) in a o-xylene, toluene or hexane solvent is passed through the membrane under convective flow at 25–60° C. for approximately 2 hours. During this time, the silanol groups on the silica support react with the methoxy groups on the GOPS. This reaction results in the incorporation of epoxide groups on the membrane including its pore surfaces.

Following the reaction to produce the modified membrane, residual silane is removed. This may be done by permeating the membrane with acetone.

This is followed by the attaching of a polyamino acid to the membrane. Such a reaction may be accomplished by reacting a terminal amine group of the polyamino acid with an epoxide group on the membrane. Specifically, a polyamino acid such as polyglutamic acid, polyaspartic acid, polylysine, polyarginine, polycysteine and any mixtures thereof is used to prepare a 100 mg/L aqueous solution at a pH of approximately 9.2–9.5. Each reaction of a terminal amine group of a polyamino acid with an epoxide group of the membrane forms a single bond. Typical water fluxes for the resulting modified silica membranes of the present invention are $18 \times 10^{-6}$ $m^3/m^2$ s at 0.7 bar. Polyamino acid attachment is followed by permeation of water at pH 3 to convert the attached polyamino acid to the H-form.

Advantageously, the chemically activated (i.e. polyamino acid functionalized), microfiltration membranes of the present invention provide excellent acid stability, solvent stability and mechanical properties. For example, the untreated membrane may easily withstand long term immersion in 30 wt percent sulfuric acid (commercially used as battery separators), while the chemically activated membrane retains some of this acid stability. Additionally, the untreated and chemically activated membranes are resistant to many organic solvents including, for example, o-xylene, toluene, hexane, and acetone. The membranes are also mechanically strong and unlike organic resins such sepharose and agarose, the membranes do not exhibit deleterious shrink/swell characteristics. The silica-based membranes of the present invention also provide increased internal surface area when compared to similarly chemically modified chemically modified cellulosic membranes. This provides a good basis for enhanced ion entrapment/sequestration performance. Metal ions (i.e. cations) become entrapped when utilizing polyamino acids such as polyglutamic acid, polyaspartic acid, polylysine, polyarginine and polycysteine whereas nitrate ions (i.e. anions) become entrapped when utilizing polyamino acids containing positively charged amines such as polylysine and polyarginine.

Advantageously, functionalization of the silica-based membrane with any polyamino acids allows one to activate the full surface of the membrane including the surface of the pores through attachment of long chain polymer units containing multiple metal binding sites. Thus, metal ions enter the pores of the membrane and become bound to the polymeric ligands attached to the pore surfaces. Accordingly, high sorption rates are achieved and the sequestration capacity of the chemically activated membrane is dramatically enhanced over a non-chemically activated membrane. For example, a polyamino acid containing approximately 60 acid groups per chain raises the capacity of the membrane on the order of 300% or more.

While many polyamino acids will achieve this desired result, it has been found that polyaspartic acids (i.e. poly-L-aspartic acid (PLAA) and poly-(αβ)-DL-aspartic acid (PDAA)) and poly-L-glutamic acid (PLGA) have several unique properties that make them ideal for metal separations. Since the properties of polyaspartic acid and polyglutamic acid are similar, further discussion will focus primarily on polyaspartic acid as a representative model. First, as shown below, polyaspartic acid has a single terminal amine group.

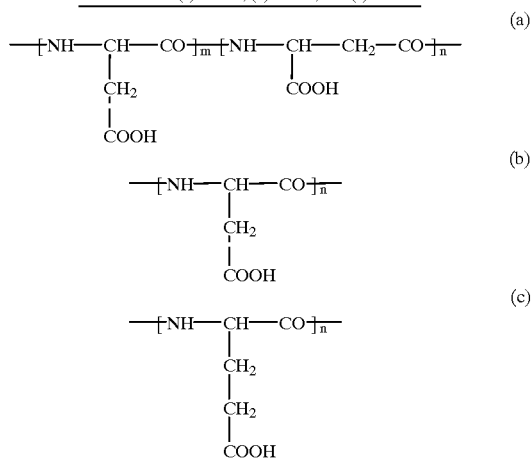

Schematics of (a) PDAA, (b) PLAA, and (c) PLGA.

Single-point attachment of the polyaspartic acid to the membrane is achieved through this amine group. As a result of single point attachment, all of the exchange groups are available in the pore spaces to which the polyaspartic acid molecules become attached. Thus, the capacity of the membrane for metal ion sequestration may be enhanced simply by increasing the molecular weight of the attached polymer. The extent of attachment will of course depend on the support membrane material, pore size range and distribution.

In addition to polymer size, ionization plays an important role. First, above their $pK_a$, the carboxylic acid (COOH) side groups of the polymer are predominantly ionized, creating one site for metal binding on each repeat unit. The degree of protonation ($\chi$) of the polymer chains is given by eq 1, $$\chi = \frac{K \exp(-e_0 \Psi(z)/kT)[H^+]}{1 + K \exp(-e_0 \Psi(z)/kT)[H^+]} \quad (1)$$

where K is the binding constant, $e_o$ is the elementary charge, $\Psi$ is the electrostatic charge field, z is the radial distance from the chain, k is the Boltzmann constant, T is temperature, and $[H^+]$ is the hydrogen ion concentration. This degree of protonation controls the line charge density encountered in counterion condensation, and results in additional metal sorption capability. The nitrogen of the peptide bond also creates interesting possibilities for metal sorption. As reported in the literature, copper may form complexes with the nitrogen of the backbone amide linkages, thereby increasing the capacity of the sorbent without occupying ionized COOH sites.

Finally, as alluded to earlier, polyamino acids (i.e. PLAA, and PDAA to some extent) may form helical species.

Ionic strength and metal cations will also affect helix formation. The helix is formed by hydrogen bonding between the amide and carbonyl groups of the polymer backbone. PDAA generally has less helix-forming ability because the interdispersion of methyl groups along the backbone increases the distance over which the hydrogen bonds must form, thereby side groups. Ionization of these side groups is a function of ionic strength, metal cation presence, and pH.

The effects of helix formation are two-fold. First, helix formation causes axial compression of the polyaspartic acid. Compression is due to a relaxation of the repulsion forces between ionized side group COOHs. Though there is some loss of capacity due to fewer ionized groups, closer residence of the remaining ionized groups magnifies their electrostatic field, increasing the overall sorbent effectiveness. The dramatic effect of the electrostatic field is described below. This action also causes radial chain expansion, allowing formation of a void near the center of the helix. This void is capable of sequestering cations because of the surrounding negative electrostatic field. (See "Surface Modification of Silica- and Cellulose-Based Microfiltration Membranes with Functional Polyamino Acids for Heavy Metal Sorption" S. M. C. Ritchie, L. G. Bachas, T. Olin, S. K. Sikdar, and D. Bhattacharyya, Langmuir, vol. 15, pages 6346–6357 (1999) the full disclosure of which is incorporated herein by reference).

Advantageously, the chemically activated, microfiltration membrane of the present invention provides for metal sorption through three primary mechanisms. These mechanisms are ion exchange, chelation and electrostatic binding. Ion exchange is governed by electroneutrality with a divalent metal cation interacting with two monovalent ligands to form a stable complex.

Chelation is a metal sorption mechanism based on complex formation. For example, a stable complex would be formed between a divalent metal and a single chelation group. Complexes may also be formed from nonionic ligands such as amide linkages where the lone pair of electrons on the nitrogen influences attraction. The maximum ratio of divalent metal to exchange group (or ligand) is 1 mol/mol. As should be appreciated, the requirements for both metal sorption via ion exchange and chelation actually function to limit metal sorption capacity to a relatively low value.

Advantageously, however, as noted above, the modified membrane of the present invention also provides a third mechanism for metal sorption: that is, electrostatic binding. This mechanism is a function of the polymeric nature of the ligands. Sorption by this technique is also sometimes referred to as counterion condensation.

Counterion condensation is based on the entrapment of ions in a "solvent sheath" that surrounds polyelectrolytes in solution. When the distance between charged groups on the polyelectrolyte becomes less than a critical value, the so-called Bjerrum length (0.71 nm), counterion condensation proceeds.

The electrostatic field created by the polyelectrolyte drives counterion condensation. When attached in a pore, charged polyamino acids will attain a stretched configuration. This is due to repulsion among the charged groups. When the electrostatic field strength is increased, such as during close packing of the chains, the concentration of counterions near the chain increases. This mechanism is known as counterion condensation, because the number of charged species does not increase, but the number of sorbed counterions increases.

The following example is presented to illustrate the invention, but is not to be considered as limited thereto.

Example 1: Composite polymer and silica-based membranes available from Daramic, Inc. were pretreated before derivatization to remove a thin coating of oil on the surface. The pretreatment was accomplished by permeation of hexane followed by acetone rinse. The derivatization involved permeation of a 5% solution (v/v) of silane (3-glycidoxypropyltrimethoxysilane (GOPS)) supplied by Aldrich in o-xylene, toluene or hexane through the membrane under convective flow at 25–60° C. for 2 hours. FIG. 1 shows the reaction scheme in which the silanol groups on the silica support were reacted with methoxy groups on the GOPS. The reaction results in epoxide group incorporation on the membrane including the pore surfaces. The membrane thus modified was then permeated with acetone to remove residual silane.

Polyamino acid attachment was performed with 100 mL of a 100 mg/L aqueous solution at pH 9.2–9.5. Polyamino acid functionalization involved the reaction at the terminal amine group with the epoxide group on the membrane. The reaction of the amine with the epoxide group forms a single bond. Accordingly, no reduction of the bond is required. Typical water fluxes were $18 \times 10^{-6}$ m$^3$/m$^2$ s at 0.7 bar for functionalized silica membranes. Polyamino acid attachment was followed by permeation of water at pH 3 to convert the attached polyamino acid to the H-form appropriate for metal ion sequestration. The polyamino acids utilized in this example varied in molar mass from 6,000 to 36,000 MW and were supplied by Sigma. In addition, a low-molar-mass poly-($\alpha,\beta$)-DL-aspartic acid (2,500 MW) was supplied by Bayer Corporation.

Metal sorption experiments were conducted with feed solutions of 1000 mg/L of $Pb^{2+}$, $Cu^{2+}$ and $Cd^{2+}$. All feed solutions were made in the lab from reagent-grade-nitrate salts and deionized ultrafiltered water from Fisher Scientific. The feed pH for each solution was 5.5 for lead and cadium and 5.0 for copper. Typical experiments involved the permeation of 100 mL of the feed solution for 1–2 hours. The permeate was recycled several times to allow the sorbent to reach its equilibrium capacity. The extent of metal sorption was established by permeate sample analysis. The experimental set up used is shown in FIG. 3.

Specifically, the set up 12 included a feed tank 14 held in a water bath 16 heated by means of an electric heating jacket 18. A thermometer 20 was provided to monitor the temperature of the feed solution in the tank 14. A variable power supply 22 was provided for adjustment of the electric heating jacket 18 and control of the temperature.

Convective flow was obtained with a variable speed pump 24 through the membrane held in a vented, dead-end stainless steel vessel 26. The set up also included a permeate tank 28 and a bleed tank 30. The cross sectional area of all the membranes studied in this work was 13.2 cm$^2$.

The internal surface area of our membranes was determined by $N_2$ adsorption at 77 K with a Micromeritics ASAP 2000 pore volume analyzer. The extent of polyamino attachment was determined by homogeneous reaction of the functionalization permeate (containing unreacted polymer) with $Cd^{2+}$, followed by ultrafiltration with an Amicon 3,000 MW cutoff membrane. Analysis of the permeate for $Cd^{2+}$ concentration allowed determination of polyamino acid attachment. All metal solution concentrations were determined with a Varian AA575 series atomic absorption spectrophotometer at 217.7 nm for Pb, 229.5 nm for Cd, and 325.3 nm for Cu. Metal analysis error was <5%.

Equilibrium metal sorption capacities for various silica-based sorbents are compared in Table 1.

TABLE 1

Metal Sorption Results for Silica-based MF Membrane Sorbents and Comparison with Other Silica-Based Ion-Exchange/Chelation Sorbents (Ritchie et al, Langmuir, (1999) 15, 6346–6357)

| | | | capacity | |
|---|---|---|---|---|
| configuration | metal | functional group | g/g | meq/g |
| membrane | Pb | PLGA | 0.3 ± 0.1 | 2.8 ± 1 |
| membrane | Pb | PLAA | 0.12 ± 0.01 | 1.2 ± 0.1 |
| membrane | Cd | PLAA | 0.08 | 1.4 |
| membrane | Pb | PLGA | 0.26 | 2.5 |
| gel | Cu | diamine | 0.03 | 0.94 |
| granular | Ba | crown ether | 0.02 | 0.32 |
| gel | Co | nitrosonaphthol | 0.03 | 1.0 |
| controlled pore glass | U[a] | diamine | 0.09 | 0.70 |

[a]As $UO_2^{2+}$.

The metal sorption capacities for membrane-based sorbents containing polyamino acids, including our previous preliminary work on poly (vinyl chloride)-silica membranes (Whatman, Inc.), were found to be consistently higher than conventional ion-exchange and chelation resins. The explanation for these differences can be found in how the metal ions are sequestered by the sorbents. The understanding of these sequestration mechanisms can be explored by characterization of the membrane at various stages. Examination of the raw membrane internal surface area and morphology is important because this affects the packing density of the attached polyamino acid chains. The solvent and water permeabilities yield valuable information on surface and pore size modifications. Polyamino acid functionalization is critical because this is the source of the groups which sequester ions (i.e. metal ions and nitrates). Finally, material regeneration will be examined for further characterization of metal polyamino acid sequestration mechanisms. The formation of helices at acidic pH and by heavy metals plays an important role in both sorption and regeneration.

Inorganic membranes are known to have exceptional chemical resistance and mechanical strength. The silica-based membrane used in this work is a composite material, composed of both inorganic (silica) and organic (polyethylene) material. These types of materials are used in battery separators and thus have strong acid resistance. Studies were also performed to determine the chemical resistance of the composite membranes to organic media. Scanning electron microscope images of the membrane both before and after functionalization show that besides the silane coating layer on the membrane, there is insignificant alteration of the membrane integrity.

Figure 4:
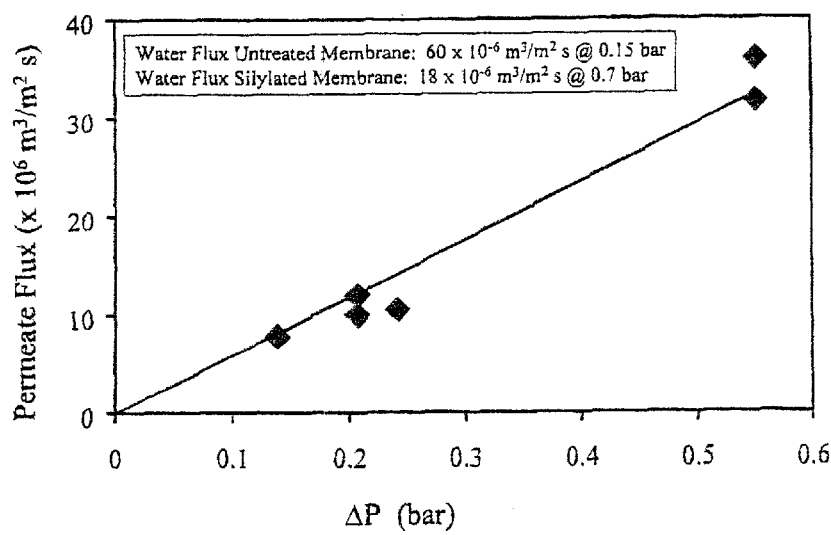
FIG. 4 graphically illustrates the organic flux (o-xylene) of a silyated silica-based membrane of the present invention and pre- and postsilanization water fluxes.

Membrane fluxes were measured before and after functionalization. Because the membrane is an MF membrane, the water flux of the untreated membrane is very high ($60 \times 10^{-6}$ m$^3$/m$^2$ s at 0.15 bar). This corresponds to a water permeability (flux/$\Delta$P) of $4 \times 10^{-4}$ m$^3$/m$^2$ s bar. FIG. 4 shows the flux of o-xylene through the membrane as a function of pressure. There is a linear relation between the flux and the pressure. However, the solvent permeability of $0.6 \times 10^{-4}$ is considerably less than that observed with water, indicating deposition of a silane layer on the membrane. The water permeability after silane attachment, $0.3 \times 10^{-4}$, is even lower because of some cross-linking of the attached silane.

When silane attachment takes place in anhydrous organic solvent, methoxy groups are only hydrolyzed by surface water on the silica. In this case, because the membrane is prerinsed with hexane and acetone, what little water that remains on the surface is used to hydrolyze methoxy groups before reaction with the silanols. Lack of water may cause incomplete hydrolysis. When the water concentration is high, such as during attachment of the polyaspartic acid, hydrolysis is complete. The remaining hydroxyl groups are then free to react with each other, cross-linking the adsorbed layer.

Figure 5:
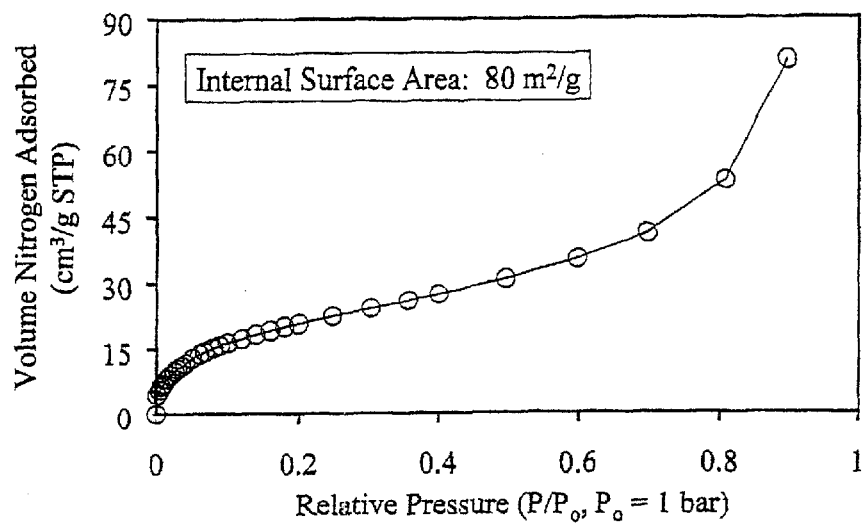
FIG. 5 graphically illustrates a nitrogen (77K) adsorption isotherm for a silica-based membrane (untreated)

Nitrogen adsorption at 77 K was used to measure the internal surface area of the membrane. The adsorption isotherm for the membrane is shown in FIG. 5. The shape of the curve is indicative of a type II BET (Brunauer, Emmett, and Teller) adsorption isotherm, that is, for a mesoporous (2–50 nm) solid without micropores (<2 nm). Therefore, BET analysis works quite well for these materials. The internal surface area of the silica-based membrane is 80 m$^2$/gm, compared to 10–35 m$^2$/gm for cellulosic membranes.

Figure 6:
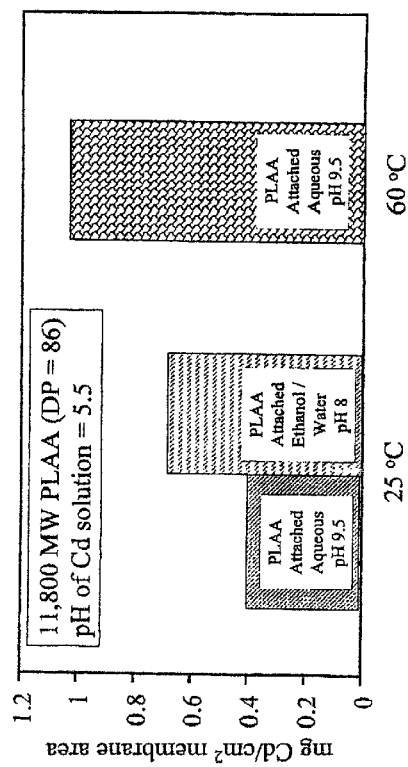
FIG. 6 graphically illustrates the effect of internal surface area on the extent of derivatization (lower points cellulosic membranes, upper points silica-based membrane)

The importance of the internal surface area, though less critical with membrane-based sorbents than with ion-exchanges resins, is shown in FIG. 6. Increasing the internal surface area should allow for an increase in the extent of derivatization. FIG. 6 shows that when the internal surface area was increased (lowest points are cellulosic membranes, highest point is silica-based membrane), the extent of derivatization is increased. It should be noted that these are absolute numbers for the given membrane cross-sectional area of 13.2 cm$^2$. When the extent of derivatization is normalized by the internal surface area of the membrane, the cellulosic membranes yield aldehyde contents of 2.4–2.9 groups/nm$^2$, whereas the silica-composite membrane has a surface concentration of 0.22 epoxide groups/nm$^2$. This results in fewer chain-chain interactions and hence will lead to higher polyamino acid functionalization.

Figure 7:
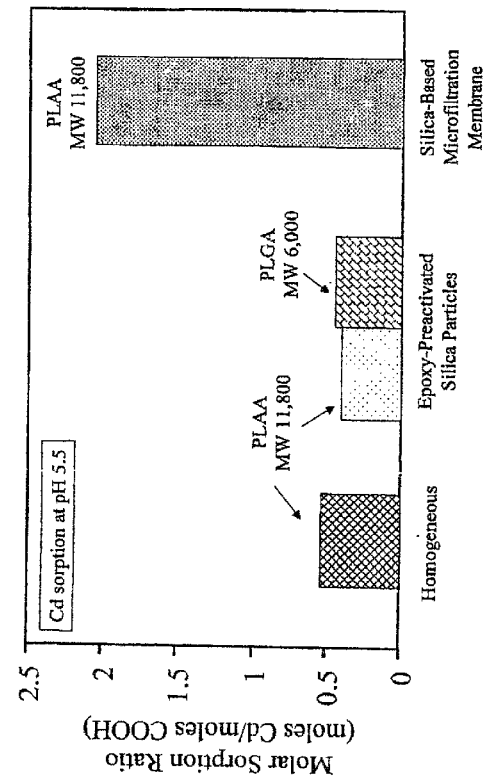
FIG. 7 graphically illustrates the effects of reaction conditions on metal entrapment capacity of silica-based membrane sorbents.

Silica membrane derivatization can be enhanced by reacting more hydroxyl groups with silica surface silanols by heat-treating the material (~80° C.) for 1–2 h. However, the polyethylene matrix of the silica-composite membrane is not compatible with operation at this temperature. Therefore, the silanizing solution was only heated to 60° C. It should be noted that only the silanizing feed solution was heated as indicated in FIG. 3. As the reaction was performed in anhydrous o-xylene (<0.005% water), water adsorption and enhanced hydrolysis of the methoxy groups is the most likely explanation for the observed flux drop behavior. Cadmium ion was selected as the model metal to study the silanization process. The increase in Cd sorption for membranes cured in this fashion is shown in FIG. 7. Compared to silanization at 25° C., Cd sorption increased from 0.4 to 1 mg of Cd/cm$^2$ of external membrane area.

Functionalization of silica-composite membranes in ethanol can also increase metal sorption. Polyamino acid attachment is typically done at pH 9.5 to suppress ionization of the terminal amine group. The negative aspects of operation at high pH (potential for siloxane bond degradation) may be avoided by the addition of ethanol to the reaction solution, which suppresses ionization of the polyamino acid terminal amine group. The PLAA was fully soluble in a 40:60 (v/v) solution of ethanol and water at pH 8. The increase in metal sorption for this method of functionalization is shown in FIG. 7. Cd sorption was nearly double that for aqueous functionalization at the same silanization temperature (25° C.). The normalized extent of functionalization for silica-composite membranes, 0.02 PLAA chains/mn$^2$ (0.17 PLAA chains/nm$^2$ for cellulosic material), was also found to be within an order of magnitude of comparable studies of peptide molecule sorption in titania (~0.2 molecules/nm$^2$).

Figure 8:
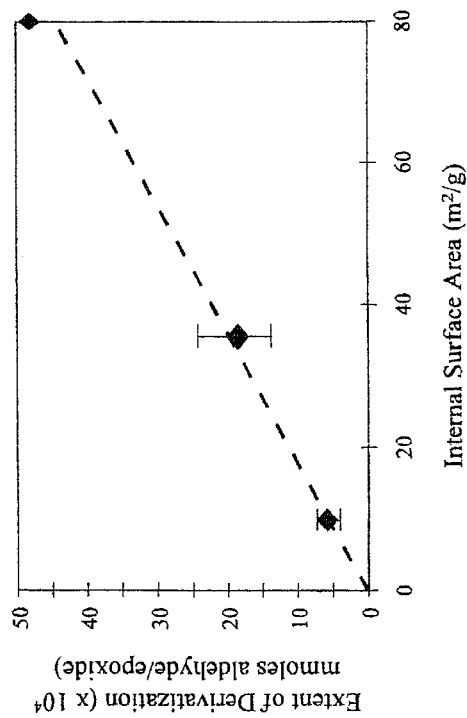
FIG. 8 graphically illustrates the Cd sorption on a silica-based membrane functionalized with PLAA (11,800 MW) represented as a function of polyamino acid loading.

The behavior Of the attached polyamino acid also affects metal sorption. FIG. 8 shows the molar sorption ratio (moles of metal per mole of COOH) of Cd on silica membranes functionalized with PLAA.

The molar sorption ratio, determined from the slope of the curve in FIG. 8, was significantly higher for the PLAA-functionalized silica-based membrane (2 vs 0.5) than for a PDAA-functionalized cellulosic membrane. Recall that the helix-forming ability of PDAA is lower than PLAA as additional methyl groups on the polyamino acid backbone increase the distance between H-bonding amide and carbonyl groups. Hence, there is greater magnification of the electrostatic charge field, for PLAA, and this will lead to greater counterion condensation and increased metal sorption.

Figure 9:
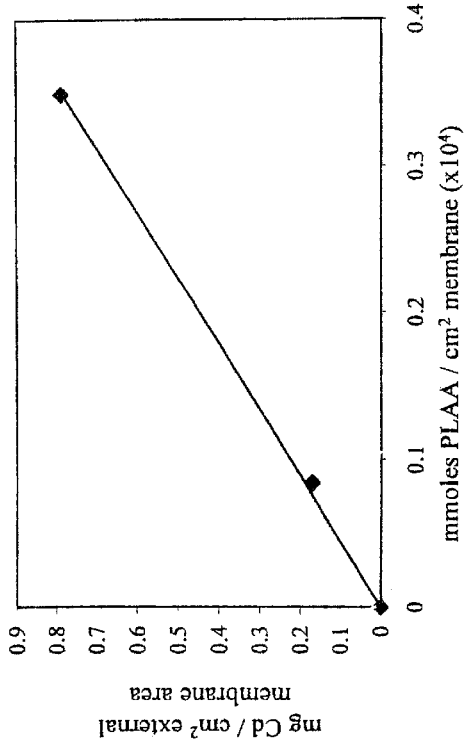
FIG. 9 graphically illustrates the surface conformation effect on polyamino acid-functionalized silica-based sorbent metal capacity.

The configuration of the support type and structure for the sorbent also affects the metal sorption ratio. FIG. 9 shows the Cd molar sorption ratios (moles of metal sorbed per mole of carboxylic acid) for polyamino acids in homogeneous solution, on commercial, nonporous, epoxy preactivated silica, and on silica-based MF membranes. In the case of the homogeneous polyamino acid, mass transfer effects are minimized and steric hindrances to chain motion are absent. The molar sorption ratio for PLAA was found to be 0.54, which corresponds quite well to a metal sorption mechanism of ion exchange, with a moderate increase in the molar sorption ratio due to chelation.

Nonporous silica beads preactivated with epoxy groups were next examined to investigate the effect of polyamino acid binding on metal sorption. As shown in FIG. 9, both PLAA and PLGA behaved similarly, with molar sorption ratios of 0.37 and 0.43, respectively. There is a modest decrease in the molar sorption ratio when the polyamino acids are bound. This is due to both increased mass transfer resistances for transport of metal ions to the surface, and decreased chain mobility. The surface to which the polyamino acids are attached is nonporous, and hence the chains are not in close residence, as they would be in a cylindrical pore.

The Cd molar sorption ratio for silica-based membrane sorbents is also shown in FIG. 9. The ratio of about 2 is much greater than observed for PLAA both in homogeneous solution (~0.5) and when bound to nonporous silica particles (~0.4), indicating a dependence on the support configuration. When the polyamino acids are attached in a porous structure, the surface is curved upon itself causing compression of the attached chains. Close packing of the chains will create an electrostatic charge field, which has a higher magnitude than for an isolated chain, thereby increasing the overall metal sorption capacity of the sorbent. It should be noted that the repulsion forces that cause extension of the chains greatly exceed the forces imparted on the chains by fluid flow. Experimentally measured equilibrium metal sorption capacity was found to be independent of the convective flow rate (flux) in the range of $10-40 \times 10^{-6}$ m$^3$/m$^2$ s. Therefore, only surface morphology and solution ionic strength control compression of the attached chains.

The molecular weight and the type of metal being sorbed have a strong influence on metal sorption. Dependence on polyamino acid molecular weight is due to the increase in the number of repeat units, and hence charged groups, on each chain. This phenomenon has also been observed in the literature for $Ca^{2+}$ binding to oligomers of polyaspartic acid. As the number of repeat units was increased from a monomer to a polymer, the metal sorption capacity increased from 0.008 to 0.07 g of Ca/g of chelating agent.

The type of metal sorbed will also affect the metal sorption capacity. This is due to two factors. First, as discussed previously (ion exchange/chelation), the stability constant of metal-ligand complexes will vary. Second, metals can form hydrolysis species, such as $[Me^{2+}{}_{n-}(OH)_m]^{(2n-m)+}$, depending on the feed solution pH. At the pH studied (5.5), polymeric species formed by Cd are negligible, whereas Pb may form substantial quantities of hydrolysis species. These species will interact more freely with polymeric ligands, as they can form more stable polydentate complexes. The importance of the types of functional groups and molecular weight is clear from the results shown in Table 2.

TABLE 2

Comparison of Metal Sorption on Polyamino Acid Functionalized Cellulosic and Silica-Based MF Membranes

| membrane[a] | metal | functional group | molecular weight | mmol (×10⁴) functional group[b] | metal sorption (mg/cm²) |
|---|---|---|---|---|---|
| PE-silica | Pb | PLGA | 36 200 | 12.1 | 2.13–4.92 |
| PE-silica | Pb | PLAA | 36 900 | 12.0 | 1.36–1.61 |
| PE-silica | Pb | PDAA[c] | 2 500 | — | 0.30 |
| CA-comp[d] | Pb | PDAA | 12 300 | 5.5 | 0.90 |
| CA[e] | Pb | PDAA | 12 300 | 5.5 | 0.59–0.95 |

[a]PE-silica: polyethylene-silica composite; CA-comp: cellulose acetate composite; CA: pure cellulose acetate.
[b]13.2 cm² external membrane area.
[c]Industrially supplied (Bayer Corporation).
[d]11 mg active layer dry weight.
[e]25 mg dry weight.

Table 2 shows a comparison of metal sorption on silica-based composite membranes with cellulosic alternatives functionalized with PDAA. Metal sorption per unit membrane external area for silica-composite membranes was comparable with that of the cellulosic membrane sorbents. The low-molecular weight PDAA (Bayer Corporation)-functionalized silica membranes also had comparable metal sorption capacities. Because this is a commercial product, this result signifies the commercial prospects of the chemically activated silica-based membranes of the present invention. PDAA of 2,500 MW has about 20 repeat units, and thus one would expect overall lower metal sorption capacities.

As membrane-based sorbents are of very high capacity, regeneration of these materials may not be necessary in some cases (e.g., Hg, Pb removal). However, regeneration would increase their utility. As such, regeneration experiments were performed to establish the extent of metal desorption and the role of helix formation. Regeneration results for both the silica-based and the cellulosic membranes are shown in Table 3.

TABLE 3

Regeneration of Polyamino Acid-Functionalized Membrane-Based Sorbents

| regeneration solution | membrane | metal sorbed | mass of metal sorbed (mg) | mass of metal recovered (mg) | % recovery of metal |
|---|---|---|---|---|---|
| 0.1 M HNO₃ | PE[a]silica | Pb | 65 | 36 | 56 |
| 20 wt % NaNO₃ @ pH 7 | PE-silica | Pb | 18–25 | 1–5 | 4–8 |
| 20 wt % NaNO₃ @ pH 3 | cellulose acetate composite[b] | Cd | 3 ± 0.1 | 3 ± 0.1 | ~100 |

[a]Polyethylene.

Two different methods of regeneration were used for the silica-based membranes. These are based on classical regeneration techniques for ion-exchange resins, namely high acid and high salt concentration cleaning. The solution ionic strength in both of these regeneration schemes will be very high, which can mask electrostatic interactions. Hence, the attached chains will be in helix form. This will cause the brush structure to tighten and diffusion of large, hydrolyzed metal species (i.e., polymeric species for Pb) from the brush will be inhibited. Indeed, this is what was observed for Pb regeneration. For 0.1 M nitric acid regeneration, approximately 56% of the sorbed Pb was recovered. When 20 wt % $NaNO_3$ at pH 7 was used, only 4–18% of the Pb was recovered.

Unlike Pb, regeneration for Cd was nearly 100%. Cd does not form hydrolyzed polymeric species, and hence it is regenerated much more easily than Pb. Complete regeneration of Cd and the limited regeneration of Pb on silica-based membrane sorbents presents an intriguing possibility. Because of the differences in recovery, there is a possibility of selective desorption of Cd over Pb from sorbed metal mixtures.

The functionalization of materials (e.g., polyamino acid functionalization of silica-composite membranes) is very important for the production of new materials with specific properties. The characterization of these new materials is also critical, and may often be accomplished through specific metal sequestration mechanisms with the modified surfaces. When these sequestration mechanisms are used for metal sorption on MF membrane supports, the results is high capacity sorbents that represent a significant advancement over conventional silica-based sorbents.

These sorbents possess excellent acid/solvent stability and the ability to obtain higher throughput because of convective flow operation. The high internal surface area of these materials makes them ideal for increasing the number of derivatized groups available for polyamino acid attachment. The derivatization density ranged between 0.22 groups/$nm^2$ to about 2.5 groups/$nm^2$ depending on the type of support materials used. As polyamino acid functionalization takes place by single point attachment, this inherently means increased metal entrapment (sorption capacity).

Use of increased temperature during silanization and the use of solvents for suppressing amine ionization during polyamino acid functionalization improved attachment efficiency. Metal sorption in these materials takes place by specific sequestration mechanisms such as ion exchange and chelation, in addition to electrostatic binding. The electrostatic (condensation zone) binding was found to be the most important for increasing the capacity, as it is unique to porous, membrane-based sorbents and the key differentiating factor from conventional silica-based sorbents. Finally, regeneration data with these sorbents indicated the role of helix-coil properties of polyamino acids on entrapment of some metals (e.g. Pb).

In summary, the present invention relates to a membrane of composite polymer and silica-based material that is chemically activated or functionalized with a large number of pendent polyamino acid chains where each such chain contains multiple metal ion binding sites. Advantageously, chelating polyamino acid chains such as polyglutamic acid and polyaspartic acid may be directly attached to the membrane at a single site. In this way it has been experimentally shown to be possible to significantly enhance the entrapment or sequestration capacity of such membranes for metal ions and nitrates.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An apparatus providing metal ion entrapment comprising:
   a chemically activated microfiltration membrane constructed from a composite polymer and silica-based material made by;
      permeating said membrane with a solution of silane in a solvent so as to react methoxy groups of said silane with silanol groups of said membrane to incorporate epoxide groups; and
      attaching a polyamino acid to said membrane by reacting a terminal amine group of said polyamino acid with one of said epoxide groups on the membrane.

2. The apparatus of claim 1 made by removing a thin coating of oil on said membrane prior to permeating.

3. The apparatus of claim 2, made by removing residual silane prior to attaching said polyamino acid.

4. The apparatus of claim 3, wherein said polyamino acid is selected from a group consisting of polyglutamic acid, polyaspartic acid, polylysine, polyarginine, polycysteine and mixtures thereof.

5. An apparatus providing ion entrapment, comprising:
   a chemically activated, microfiltration, composite polymer and silica-based membrane including a polyamino acid attached thereto through reaction of a terminal amine group of said polyamino acid with said membrane.

6. The apparatus of claim 5, wherein said terminal amine group reacts with an epoxide group on said membrane.

7. An apparatus providing nitrate entrapment comprising:
   a chemically activated microfiltration membrane constructed from a composite polymer and silica-based material made by;
      permeating said membrane with a solution of silane in a solvent so as to react methoxy groups of said silane with silanol groups of said membrane to incorporate epoxide groups; and
      attaching a polyamino acid to said membrane by reacting a terminal amine group of said polyamino acid with one of said epoxide groups on the membrane.

8. The apparatus of claim 7 made by removing a thin coating of oil on said membrane prior to permeating.

9. The apparatus of claim 8, made by removing residual silane prior to attaching.

10. The apparatus of claim 9, wherein said polyamino acid is selected from a group consisting of polylysine, polyarginine and mixtures thereof.

* * * * *